United States Patent
Wakamatsu

(10) Patent No.: US 9,813,627 B2
(45) Date of Patent: Nov. 7, 2017

(54) IMAGE SHAKE CORRECTING APPARATUS AND ITS CONTROL METHOD, LENS BARREL, OPTICAL EQUIPMENT, AND IMAGING APPARATUS

(71) Applicant: CANON KABUSHIKI KAISHA, Tokyo (JP)

(72) Inventor: Nobushige Wakamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/341,947

(22) Filed: Jul. 28, 2014

(65) Prior Publication Data

US 2015/0042828 A1 Feb. 12, 2015

(30) Foreign Application Priority Data

Aug. 8, 2013 (JP) ................................ 2013-165488

(51) Int. Cl.
*H04N 5/232* (2006.01)

(52) U.S. Cl.
CPC ..... *H04N 5/23258* (2013.01); *H04N 5/23254* (2013.01); *H04N 5/23287* (2013.01); *H04N 5/23296* (2013.01); *G03B 2217/005* (2013.01)

(58) Field of Classification Search
CPC .......... H04N 5/23264; H04N 5/23258; H04N 5/2328; H04N 5/23283; H04N 5/23287; (Continued)

(56) References Cited

U.S. PATENT DOCUMENTS

| 5,649,237 A | 7/1997 | Okazaki |
| 6,630,950 B1 * | 10/2003 | Ohkawara et al. ...... 348/208.12 |

(Continued)

FOREIGN PATENT DOCUMENTS

| CN | 101753845 A | 6/2010 |
| CN | 102455567 A | 5/2012 |

(Continued)

OTHER PUBLICATIONS

Chinese Official Action dated Jul. 21, 2016, issued in corresponding Chinese Patent Application No. 201410389611.X, with an English translation.

(Continued)

*Primary Examiner* — Paul Berardesca
(74) *Attorney, Agent, or Firm* — Fitzpatrick, Cella, Harper & Scinto

(57) ABSTRACT

An image shake correcting apparatus includes a shake detecting unit to detect shake of an apparatus containing an imaging optical system. A calculating unit calculates an image shake correction amount by acquiring a shake detection signal output from the shake detecting unit. A shake correcting unit corrects an image shake in accordance with the image shake correction amount calculated by the calculating unit. The calculating unit calculates an imaging magnification of the imaging optical system, and calculates the image shake correction amount by calculating a first correction amount before change of a frequency range of a correction filter and calculates the image shake correction amount by a second correction amount after change of a frequency range, in accordance with a size of the imaging magnification.

13 Claims, 8 Drawing Sheets

(58) Field of Classification Search
CPC ........... H04N 5/23248; H04N 5/23261; G03B 2217/005; G03B 2205/0007; G02B 27/64; G02B 27/646
See application file for complete search history.

(56) References Cited

U.S. PATENT DOCUMENTS

| | | |
|---|---|---|
| 7,430,367 B2 | 9/2008 | Imada |
| 7,983,547 B2 | 7/2011 | Miyasako |
| 8,159,545 B2 | 4/2012 | Washisu et al. |
| 8,175,448 B2 | 5/2012 | Miyasako |
| 8,305,455 B2 | 11/2012 | Washisu et al. |
| 8,509,610 B2 | 8/2013 | Wakamatsu |
| 8,711,272 B2 | 4/2014 | Noto et al. |
| 8,873,942 B2 | 10/2014 | Wakamatsu |
| 9,055,224 B2 | 6/2015 | Wakamatsu |
| 2003/0142218 A1* | 7/2003 | Yamazaki .................. 348/208.6 |
| 2006/0165398 A1* | 7/2006 | Imada ........................... 396/55 |
| 2013/0165753 A1 | 6/2013 | Takahashi |

FOREIGN PATENT DOCUMENTS

| | | |
|---|---|---|
| CN | 102804053 A | 11/2012 |
| CN | 102854701 A | 1/2013 |
| CN | 103096781 A | 5/2013 |
| JP | H05-323436 A | 12/1993 |
| JP | H07-225405 A | 8/1995 |
| JP | H10-010596 A | 1/1998 |
| JP | 2006-208691 A | 8/2006 |
| JP | 2010-025962 A | 2/2010 |
| JP | 2012-088466 A | 5/2012 |
| JP | 2013-003325 A | 1/2013 |
| JP | 2014-215357 A | 11/2014 |

OTHER PUBLICATIONS

U.S. Appl. No. 14/337,288, filed Jul. 22, 2014, Nobushige Wakamatsu.
U.S. Appl. No. 14/339,745, filed Jul. 24, 2014, Nobushige Wakamatsu.
Japanese Official Action dated Mar. 21, 2017, issued in corresponding Japanese Patent Application No. 2013-165488, with an English translation.

* cited by examiner

IMAGE SHAKE CORRECTING APPARATUS AND ITS CONTROL METHOD, LENS BARREL, OPTICAL EQUIPMENT, AND IMAGING APPARATUS

CLAIM OF PRIORITY

This application claims the benefit of Japanese Patent Application No. 2013-165488, field Aug. 8, 2013, which is hereby incorporated by reference herein in its entirety.

BACKGROUND OF THE INVENTION

Field of the Invention

The present invention relates to an image shake correcting apparatus for correcting image shake due to hand shake, and the like, and an imaging apparatus. In particular, the present invention relates to a technology for smoothly correcting image shake during macrophotography.

Description of the Related Art

With respect to a camera incorporating an image shake correcting apparatus, in order to enable photography without image shake, angular shake of the camera due to hand movement, or the like, is detected, and an image shake correcting lens (hereafter "correcting lens") is driven in accordance with detection values. In this process, it is necessary to accurately detect camera shake and to correct changes in the optical axis due to shaking. Image shake is suppressed by a vibration detecting unit (angular velocity meter, or the like) that obtains detection results, such as angular velocity, and a drive control unit that drives a correcting member (correcting lens, or the like) based on calculating processing results.

Incidentally, in the case of close range photography (an imaging condition of high imaging magnification), there is shake that cannot be detected by an angular velocity meter alone. This is so-called translational shake that is applied in a direction parallel to or vertical to the optical axis of the camera, and image degradation caused thereby cannot be ignored. For example, under conditions when imaging is performed by approaching to within 20 cm of the subject in macrophotography, or when the focal distance of the imaging optical system is extremely large (e.g., 400 mm) relative to a subject that is at a distance of 1 m from the camera, it is necessary to actively detect translational shake and to perform correction.

Japanese Patent Laid-Open No. H7-225405 discloses a technology that translational shake is detected by an acceleration meter, the translational shake is obtained from second order integration of the acceleration meter, and a shake correction unit is driven in accordance with an output of a separately provided angular velocity meter. In this case, the output of the acceleration meter tends to be affected by environmental change, such as external noise or temperature variation, further increasing factors of instability due to second order integration, and thereby inhibiting highly accurate correction of translational shake. Japanese Patent Laid-Open No. 2010-25962 discloses a technology that translational shake is obtained by considering the translational shake as angular shake, when the center of rotation is located away from the camera. An angle and a correction value using a rotation radius of angular shake are obtained from the respective outputs of an angular velocity meter and an acceleration meter, and shake correction is performed. By obtaining a center of rotation by restriction to a frequency range that tends to be unaffected by external disturbances, the effects on correction from factors of instability of the acceleration meter can be mitigated.

Generally, if a cutoff frequency of a filter used in image shake correction is set low and if the frequency range is broadened, it is possible to improve performance by performing shake correction of low-frequency components with respect to movement of the body of a photographer, or the like. However, when the frequency range on the low-frequency side of the filter is expanded, the possibility conversely arises that performance will deteriorate, because the position of the correcting member reaches the limit of a movable range, given that the correcting member has a limited movable range.

Moreover, with the translational shake correction using a rotation radius disclosed in Japanese Patent Laid-Open No. 2010-25962, it is difficult to accurately perform correction in a low-frequency range. With respect to the rotation radius, the rotation radius is specified in a predetermined frequency range for calculation, and the extracted frequency is mainly set to between 1 Hz and 10 Hz. Consequently, with respect to shake of 1 Hz or less, it may happen that a rotation radius cannot be accurately obtained. Moreover, in the case when an actual rotation radius with a shake of 1 Hz, or less, is less than the rotation radius obtained by calculating operations, excessive shake correction that differs from actual translational shake may occur with respect to correction in a low-frequency range of 1 Hz or less. Under the foregoing conditions, it is to be feared that image shake correction performance will decline due to excessive correction associated with expansion of the frequency range on the low-frequency side of the filter.

SUMMARY OF THE INVENTION

The present invention raises the accuracy of image shake correction in an image shake correcting apparatus.

According to an aspect of the present invention, an image shake correcting apparatus is provided that includes a shake detecting unit configured to detect shake of an apparatus containing an imaging optical system, a calculating unit configured to calculate image shake correction amount by acquiring a shake detection signal output from the shake detecting unit, and a shake correcting unit configured to correct an image shake in accordance with the image shake correction amount calculated by the calculating unit. The calculating unit calculates an imaging magnification of the imaging optical system, and calculates the image shake correction amount by calculating a first correction amount before a change of a frequency range of a correction filter, and calculates the image shake correction amount by a second correction amount after a change of a frequency range, in accordance with a size of the imaging magnification.

According to the present invention, it is possible to raise the accuracy of image shake correction in an image shake correcting apparatus.

Further features of the present invention will become apparent from the following description of exemplary embodiments (with reference to the attached drawings).

DESCRIPTION OF THE EMBODIMENTS

Hereafter, preferred embodiments of the present invention will be described with reference to the drawings. The present invention is applicable to, for example, an interchangeable lens attached to a digital single lens reflex camera, optical equipment, such as a lens barrel, an imaging apparatus, such as a digital video camera, a monitoring camera, a Web camera, or the like, and electronic equipment including an imaging apparatus, such as a mobile phone, a tablet terminal, or the like.

First Embodiment

Figure 1:
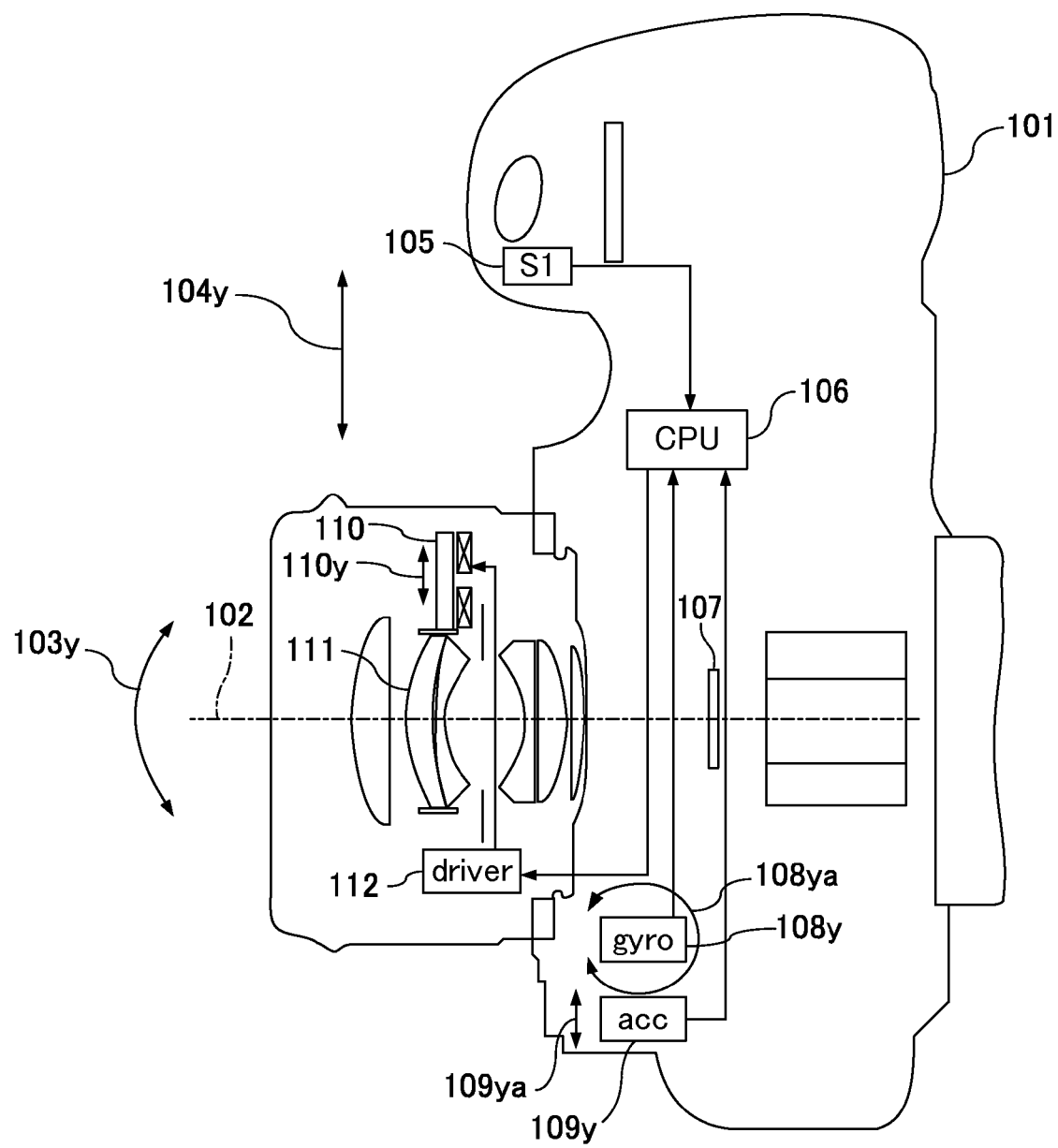
FIG. 1 is a top view of a camera incorporating the image shake correcting apparatus according to the present invention.
Figure 2:
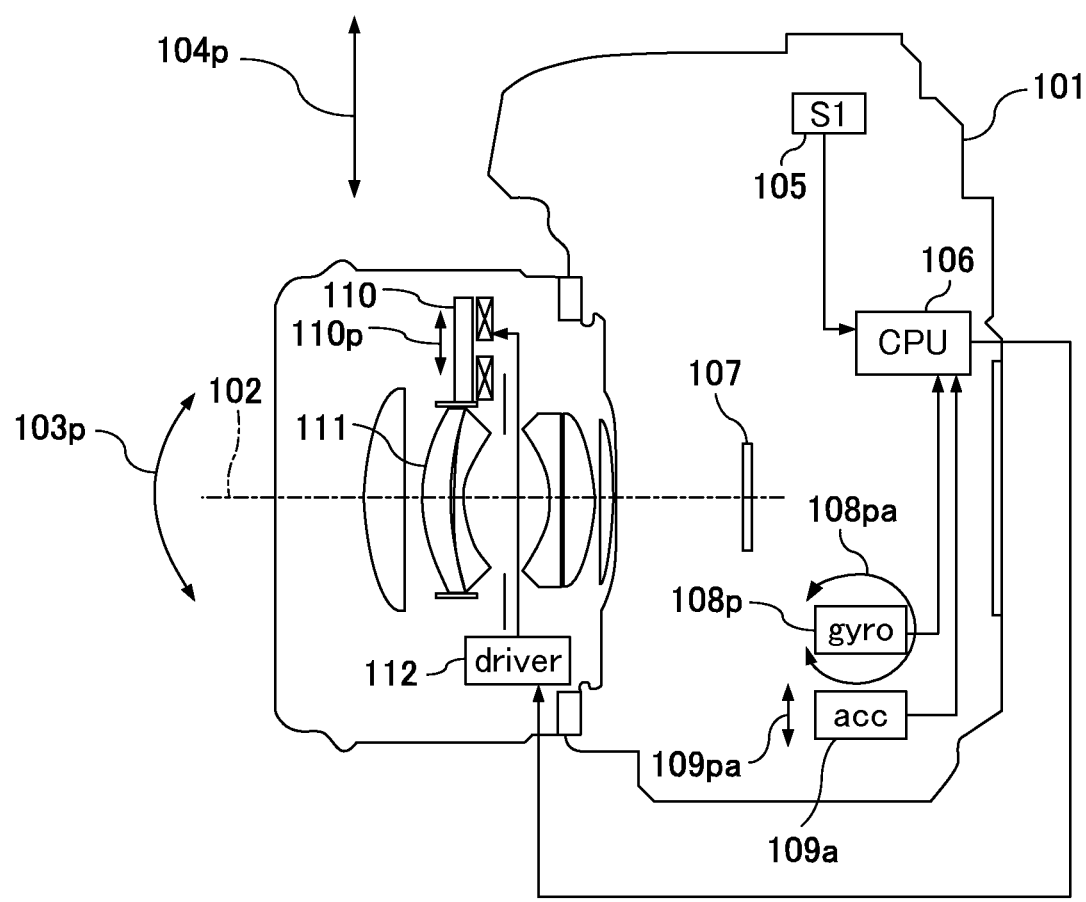
FIG. 2 is a side view of a camera incorporating the image shake correcting apparatus according to the present invention.

FIG. 1 and FIG. 2 are a plan view and a side view, which show an imaging apparatus provided with an image shake correcting apparatus according to a first embodiment of the present invention. An image shake correcting apparatus incorporated in an imaging apparatus performs image shake correction of shaking indicated by arrow marks 103$p$ and 103$y$ (hereafter "angular shake"), and shaking indicated by arrow marks 104$p$ and 104$y$ (hereafter "translational shake") relative to an optical axis 102.

An imaging apparatus 101 is provided with an operating switch (release SW) 105 using a release button, and a camera CPU (central processing unit) 106 performs a variety of processing such as image shake correction by running a control program. An imaging element 107 performs photoelectric conversion of subject light that is formed into an image by an imaging optical system. Angular velocity detectors (hereafter "angular velocity meters") 108$p$ and 108$y$ respectively detect angular shake around arrow marks 108$pa$ and 108$ya$. Angular shake refers to shaking around an axis that is orthogonal to an optical axis of the imaging optical system. A direction around a first axis that is orthogonal to the optical axis is considered as a pitch direction p, and a direction around a second axis that is orthogonal to the optical axis and the first axis is considered as a yaw direction y.

Acceleration detectors (hereafter "acceleration meters") 109$p$ and 109$y$ respectively detect translational shake indicated by arrow marks 109$pa$ and 109$ya$. This translational shake is shaking in a direction perpendicular to the optical axis of the imaging optical system. Arrow mark 109$pa$ represents a longitudinal direction, and arrow mark 109$ya$ represents a lateral direction, respectively.

A lens drive unit 110 drives at will a correcting lens 111 in the directions of arrow marks 110$y$ and 110$p$ of FIG. 1 and FIG. 2 to perform image shake correction that takes account of both angular shake and translational shake. The respective outputs of the angular velocity meters 108$p$ and 108$y$ and the acceleration meters 109$p$ and 109$y$ are input to the camera CPU 106. The camera CPU 106 performs image shake correction by controlling the lens drive unit 110 based on these outputs.

With respect to the image shake correcting unit, the present embodiment adopts so-called optical vibration isolation that causes the correcting lens 111 to move in a plane perpendicular to the optical axis based on calculated correction amounts. However, a correction method based on correction amounts is not limited to optical vibration isolation. For example, it is also acceptable to adopt a mode that performs image shake correction by causing movement of an imaging element in a plane perpendicular to the optical axis, or a mode of electronic vibration isolation that mitigates the effects of shaking by changing an image trimming position of each imaging frame that is output by an imaging element. Or, the purpose of the present invention may be achieved by performing correction by a combination of these.

Figure 3:
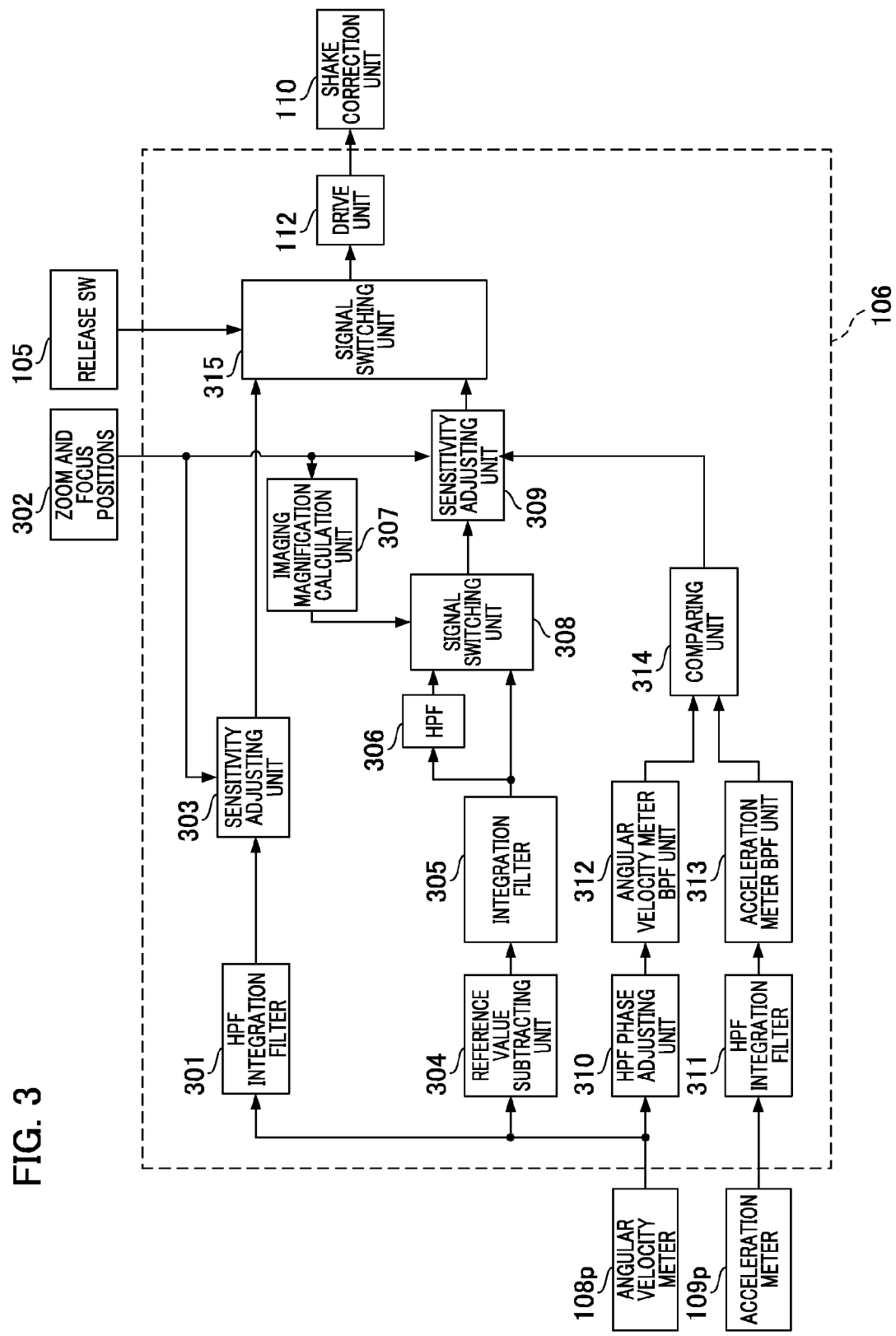
FIG. 3 is a block diagram illustrating an image shake correcting apparatus according to a first embodiment of the present invention.

FIG. 3 is a block diagram illustrating an image shake correcting apparatus according to the first embodiment of the present invention. Components in the camera CPU 106 are shown as function blocks. FIG. 3 shows only a configuration related to shaking that occurs in a vertical direction of the camera (pitch directions: the directions of arrow marks 103$p$ and 104$p$ of FIG. 2). The same configuration is also provided with respect to shaking that occurs in a horizontal direction of the camera (yaw directions: the directions of arrow marks 103$y$ and 104$y$ in FIG. 1). As these are basically the same configuration, only the configuration relating to the pitch direction is illustrated in the following description.

First, a description will be given of a first calculating unit (see 301, 303, and 315) that calculates a first image shake correction amount based on an image shake detection signal. The angular velocity meter 108$p$ outputs an angular velocity signal as an image shake detection signal to the camera CPU 106. The angular velocity signal is input to an HPF integration filter 301, where it is integrated after DC (direct-current) components are filtered out by the HPF (high-pass filter), and converted to an angle signal. As shown on the left side of Formula (1) below, an angle calculation filter for correction is a filter that combines an integrator ("1/s" at the left side of Formula (1)) and an HPF ("Ts/(Ts+1)" at the left side of Formula (1)). As shown on the right side of the below Formula (1), this is identical to a formula obtained by multiplying a time constant T by a low-pass filter (LPF) of the time constant T.

[Formula 1]

$$\frac{1}{s} \times \frac{Ts}{Ts+1} = \frac{T}{Ts+1} \tag{1}$$

Ts represents a time constant of the HPF on the left side of Formula (1), and T represents a time constant of the LPF on the right side of Formula (1). Accordingly, an HPF is contained in the angle calculation filter, and when another HPF is connected at the preceding level of the angle calculation filter, a secondary HPF is constituted with respect to the filter from an output of the angle velocity meter 108p until an angle calculation.

The output of the HPF integration filter 301 is input to a sensitivity adjusting unit 303. Positional information 302 of the zoom lens and the focus lens are input to the sensitivity adjusting unit 303. The positional information 302 is acquired by known detection methods by a position detector (not illustrated in the drawings) that is provided in the lens barrel. The sensitivity adjusting unit 303 amplifies the output of the HPF integration filter 301, and calculates a correction amount (hereafter "shake correction amount 1") based on a focal distance and an imaging magnification obtained from the positional information 302 of the zoom lens and the focus lens. The shake correction amount 1 is input to a signal switching unit 315. Here, imaging magnification refers to the ratio of a size of a subject image captured through a lens (size of image on an imaging plane) and an actual size of a subject.

Next, a description will be given of a second calculating unit (see 304 to 309, 315) that calculates a second image shake correction amount based on an angular shake detection signal. The output of the angular velocity meter 108p is also input to a reference value subtracting unit 304. The reference value subtracting unit 304 calculates an offset component of the angular velocity meter 108p, subtracts the calculated offset component from angular velocity, and outputs it to an integration filter 305. The reference value subtracting unit 304 calculates an offset reference value of an output of the angular velocity meter 108p. This offset reference value is an angular velocity offset component that is added to the output of the angular velocity meter 108p as detection noise. For example, an output value of the angular velocity meter 108p is acquired when an amplitude of angular acceleration obtained by differentiating angular velocity or angular velocity after passing through HPF is less than a predetermined threshold value. By a method that smoothly connects the output value by means of an LPF, which cutoff frequency is set extremely low, the angular velocity offset, which is a DC component, is calculated. The calculated offset reference value is retained until the power supply of the angular velocity meter 108p is turned off.

The output of the integration filter 305 is input to an HPF 306 and a signal switching unit 308. The HPF 306 cuts the low-frequency component and outputs it to the signal switching unit 308. The signal switching unit 308 acquires an imaging magnification from an imaging magnification calculation unit 307. The imaging magnification calculation unit 307 calculates imaging magnification by acquiring the positional information 302 of the zoom lens and the focus lens. The signal switching unit 308 compares the imaging magnification to a threshold value, selects an output of the integration filter 305 or an output of the HPF 306 according to the size of the imaging magnification, and outputs it to a sensitivity adjusting unit 309. The output of the HPF 306 selected in the case when imaging magnification exceeds the threshold value corresponds to the first correction amount before the frequency range of the angle calculation filter for correction is changed. The output of the integration filter 305 that is selected in the case when the imaging magnification is at or below the threshold value corresponds to the second correction amount after the frequency range has been changed. In the case when the HPF 306 is contained in the angle calculation filter, the filter from the output of the angular velocity meter 108p until angle calculation, as described above, is configured to be a secondary HPF. Consequently, phase greatly advances in the low-frequency range (up to 1 Hz) of shaking, and the image shake effect is reduced.

Panning and tilting operations are affected by the properties of the filter containing the secondary HPF. When significant swing is produced by panning, or the like, the low-frequency components of large amplitude are attenuated, with the result that, at the time of panning termination, for example, a signal is produced in a direction that is the reverse of the panning direction (so-called swing back phenomenon occurs). Subsequently, this signal gradually converges on zero, and when image shake correction is performed based on this signal, the correction amount is calculated by a signal that differs from the actual shake of the imaging apparatus. Consequently, there is the possibility that the accuracy of shake correction may be reduced.

Accordingly, it is preferable for purposes of image shake correction to have a filter configuration that does not contain the HPF 306, but gain in the low-frequency range is increased in this case. Consequently, appropriate image shake correction may be inhibited when the correction range is insufficient in a limited movable range of the image shake correcting member. The image shake correction amount increases when imaging magnification is large, compared to when imaging magnification is small. Consequently, the correction range may be insufficient when imaging magnification is large. Thus, the signal switching unit 308 compares an imaging magnification to a predetermined threshold value that has been set in advance. When the imaging magnification is equal to or less than the threshold value, the image shake correction effect is enhanced by calculating a shake correction amount using the output of the integration filter 305. When the imaging magnification is larger than the threshold value, a shake correction amount is calculated using the output of the HPF 306, so that appropriate image shake correction is performed, wherein the correcting member does not exceed the movable range.

A description will be given below of translational shake correction processing, and of the reasons why the image shake correction amount increases when imaging magnification is large. The sensitivity adjusting unit 309 performs processing for conversion to an image shake correction amount that takes account of angular shake and translational shake. The output of the angular velocity meter 108p is input to the HPF phase adjustment filter (hereafter "HPF phase adjusting unit") 310. The HPF phase adjusting unit 310 performs phase adjustment of the signal while cutting the DC component that is superimposed onto the output of the angular velocity meter 108p. The cut-off frequency here is adapted to the cut-off frequency of the HPF of the below-mentioned HPF integration filter 311, and is adjusted so that the frequency properties match. With respect to the output of the HPF phase adjusting unit 310, only frequency components in the predetermined range are extracted by an angular velocity meter BPF (band pass filter) 312.

An acceleration meter 109a outputs translational shake detection signals. The output of the acceleration meter 109p is input to the HPF integration filter 311, and the HPF constituting the pertinent filter cuts the DC component, after which the integration filter performs conversion to a velocity signal. As stated above, the HPF cut-off frequency at this time is set to conform to the HPF frequency properties of the HPF phase adjusting unit 310. With respect to the output of the HPF integration filter 311, only frequency components in the predetermined range are extracted by an acceleration meter BPF 313.

The respective outputs of the angular velocity meter BPF 312 and the acceleration meter BPF 313 are input to a comparing unit 314, and a correction amount (correction coefficient) that is set for the sensitivity adjusting unit 309 is calculated. The correction amount calculation processing of the comparing unit 314 is described below. The sensitivity adjusting unit 309 acquires the positional information 302 of the zoom lens and the focus lens, and the output of the signal switching unit 308. The sensitivity adjusting unit 309 amplifies the output of the signal switching unit 308 based on the focal distance and the image magnification obtained from the positional information 302 of the zoom lens and the focus lens, and the correction coefficient from the comparing unit 314. The sensitivity adjusting unit 309 calculates a correction amount (hereafter "shake correction amount 2"), and outputs it to the signal switching unit 315.

Figure 4:
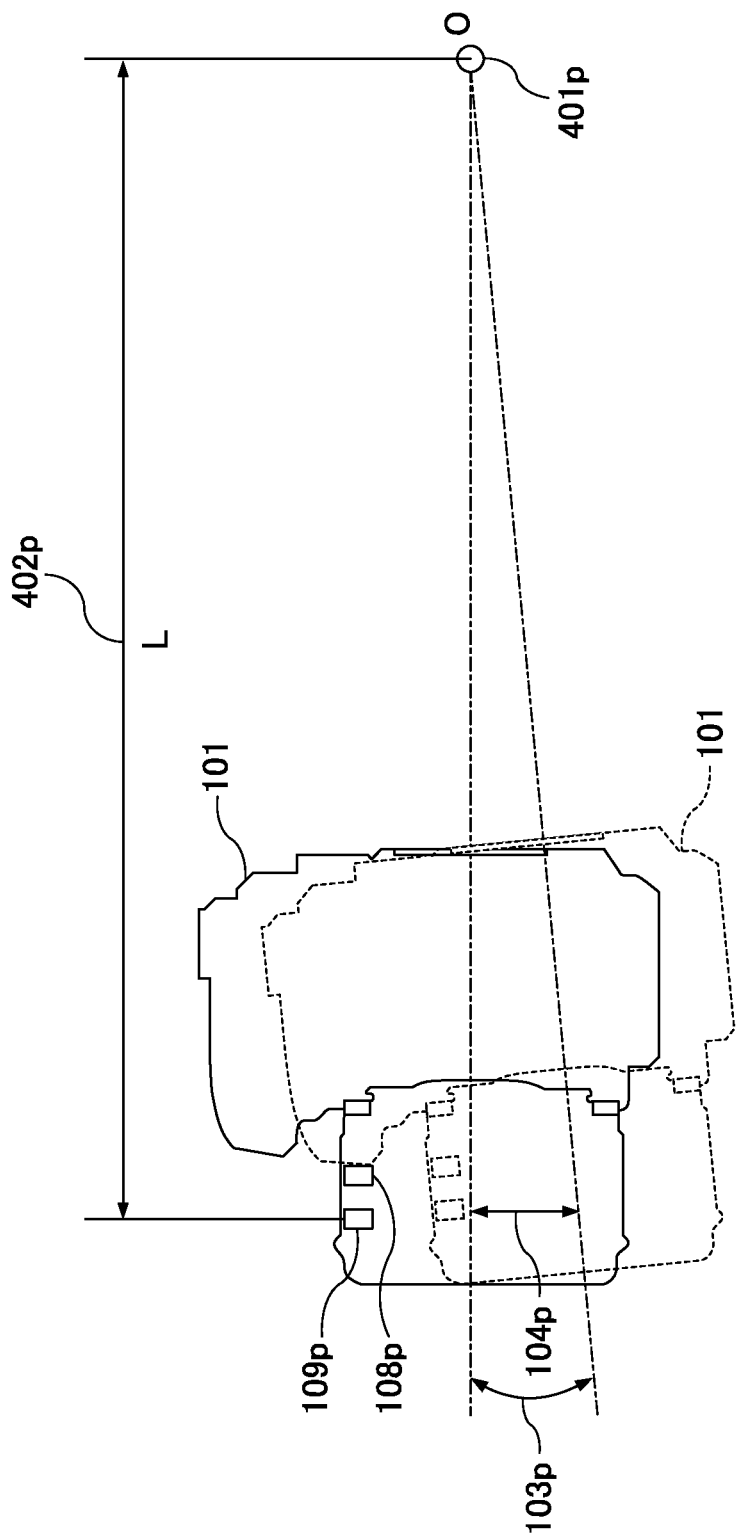
FIG. 4 is an explanatory view illustrating a center of rotation of shaking in the present invention.

Next, a description will be given of calculation processing for the correction coefficient that is output from the comparing unit 314, and calculation processing for the shake correction amount in the sensitivity adjusting unit 309. FIG. 4 is a drawing illustrating an angular shake 103p and a translational shake 104p that are imparted to a camera. In a photographic lens of the imaging apparatus 101, it is considered that a size of the translational shake 104p is considered as Y and a size of the angular shake 103p is as θ, at a main focal position of the imaging optical system. A relationship with a rotation radius L (402p) in the case when a center of rotation O (401p) has been established is represented by the following formula.

[Formula 2]

$$Y = L \times \theta \quad (2)$$

$$V = L \times \omega \quad (3)$$

$$A = L \times \omega a \quad (4)$$

ω is angular velocity, ωa is angular acceleration, V is speed, and A is acceleration. The rotation radius L (402p) is a distance from a center of rotation 401p to an acceleration meter 109p. In Formula (2), a value of the rotation radius L is calculated from a displacement Y obtained by performing second-order integration of an output of the acceleration meter 109p, and an angle θ obtained by performing first-order integration of an output of the angular velocity meter 108p. In Formula (3), a value of the rotation radius L is calculated from a velocity V obtained by performing first-order integration of an output of the acceleration meter 109p, and an angular velocity ω obtained from an output of the angular velocity meter 108p. In Formula (4), a value of a rotation radius L is calculated from an acceleration A obtained from an output of the acceleration meter 109p, and an angular acceleration ωa obtained by performing first-order differentiation of an output of the angular velocity meter 108p. The rotation radius L may be obtained by any of these methods.

A shake δ produced in the imaging plane is obtained by the below Formula (5) from the translational shake Y at the main focal position of the imaging optical system, a shake angle θ of the imaging optical system, and a focal distance f and an imaging magnification β of the imaging optical system.

[Formula 5]

$$\delta = (1+\beta) \times f \times \theta + \beta \times Y \quad (5)$$

"f" and "β" in the first term on the right side of Formula (5) are obtained from positions of the zoom lens and the focus lens of the imaging optical system, and an imaging magnification and a focal distance obtained therefrom. A shake angle θ is obtained as a result of integration of the angular velocity meter 108p. Consequently, an angular shake can be corrected as described using FIG. 3. As the second term on the right side of Formula (5) is obtained from Y, which is a second-order integration value of the acceleration meter 109p, and an imaging magnification β obtained from the zoom and focus positions, translational shake correction can be performed in accordance with this information.

However, in the present embodiment, image shake correction is performed with respect to a shake δ obtained by rewriting Formula (5) as the following Formula (6).

[Formula 6]

$$\delta = (1+\beta) \times f \times \theta + \beta \times L \times \theta = ((1+\beta) \times f + \beta \times L) \times \theta \quad (6)$$

That is, with respect to translational shake, the product of θ and the rotation radius L is used, without using the translational shake displacement Y that is directly obtained from the acceleration meter 109p. Image shake correction is performed by calculating a shake δ from a rotation radius L obtained by the above Formula (2), Formula (3), or Formula (4), an integration result (θ) that is an output of the angular velocity meter 108p, and a focal distance f and an imaging magnification β.

Figure 5:
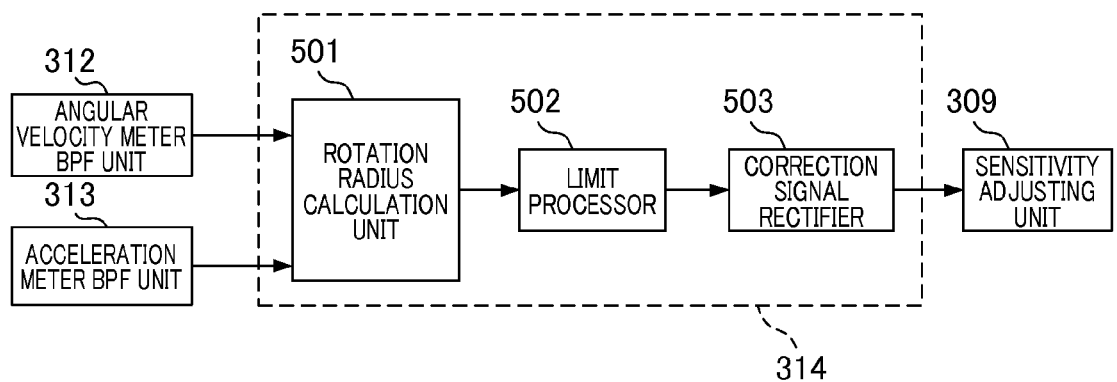
FIG. 5 is a block diagram illustrating the image shake correcting apparatus according to the first embodiment of the present invention.

FIG. 5 is a block diagram illustrating correction amount (correction coefficient) calculation processing in the comparing unit 314 shown in FIG. 3. A rotation radius calculation unit 501 of the comparing unit 314 acquires the respective outputs of the angular velocity meter BPF 312 and the acceleration meter BPF 313, and calculates the rotation radius L using the below Formula (7).

[Formula 7]

$$L = V/\omega \quad (7)$$

The rotation radius L may be calculated from an amplitude, or the like, of a waveform that is sampled at predetermined time (sampling time) intervals. Furthermore, with respect to the timing of updating of the rotation radius L, it may be performed at each moment of calculation, or chronological averaging processing or processing that cuts the high-frequency component in LPF may be performed.

The rotation radius L after calculation is performed by calculation processing using an upper limit value that is set by a limit processor 502. When the output value of the rotation radius calculation unit 501 is equal to or more than the upper limit value, the limit processor 502 fixes the output value at the upper limit value. When the output value is less than the upper limit value, the output value is output as is. The output value of the limit processor 502 is processed in a correction signal rectifier 503. The correction signal rectifier 503 respectively rectifies the output values of the limit processor 502, and performs signal processing so that abrupt stepwise changes do not occur in the correction signals. For example, signal rectification is performed by cutting the high-frequency components in the LPF. The LPF cutoff frequency is set to a low frequency of, for example, 0.5 Hz or less. Or, a calculating unit, or the like, is provided, which calculates an average of movement over a predetermined time period. The output of the correction signal rectifier 503 is output to the sensitivity adjusting unit 309 as a signal that indicates the final rotation radius used in image shake correction of translational shake.

The image shake correction signal that is output by the sensitivity adjusting unit 309 is input to the signal switching unit 315 (see FIG. 3). The output of the sensitivity adjusting unit 303 and the output of the release SW (switch) 105 are simultaneously input to the signal switching unit 315, and the output of the sensitivity adjusting unit 303, or the output of the sensitivity adjusting unit 309 is selected according to the condition of the release SW 105, and is output to a drive unit 112. The image shake correction signal from the sensitivity adjusting unit 309 indicates a correction value without HPF processing when imaging magnification is equal to or less than a predetermined threshold value in the signal switching unit 308. When there is no HPF processing, the calculated correction value includes an offset due to the effect of the output noise component of the angular velocity meter 108p. Below, in the case of a configuration wherein HPF processing is not performed, a description will be given of how a correction value, including an offset, is used in image shake correction.

Figure 6:
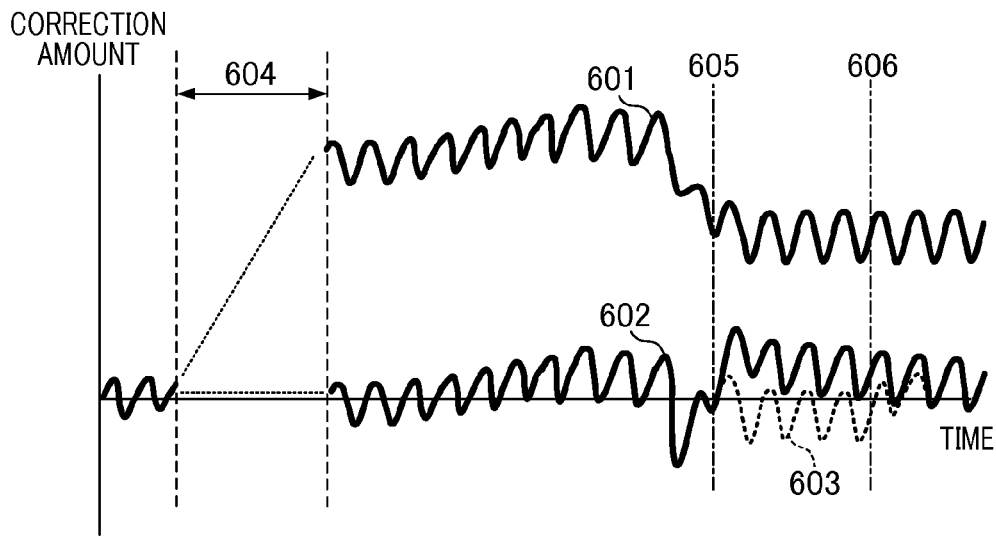
FIG. 6 is a wave diagram illustrating a shake correction amount calculation according to the first embodiment of the present invention.

FIG. 6 is a waveform drawing illustrating shake correction processing during imaging, and, at times, apart from imaging. A waveform 601 indicates a temporal change of a shake correction amount 2 calculated by the sensitivity adjusting unit 309. A waveform 602 indicates a temporal change of a shake correction amount 1 calculated by the sensitivity adjusting unit 303. As an HPF is not provided, the shake correction amount 2 gradually moves away from the vicinity of zero over time when the power is turned on, as shown by the waveform 601. For example, when an offset temperature drift of the angular velocity meter occurs in a time interval 604, a shake correction amount 2 is calculated that moves away from the zero center over time due to the effect of temperature drift.

Figure 7:
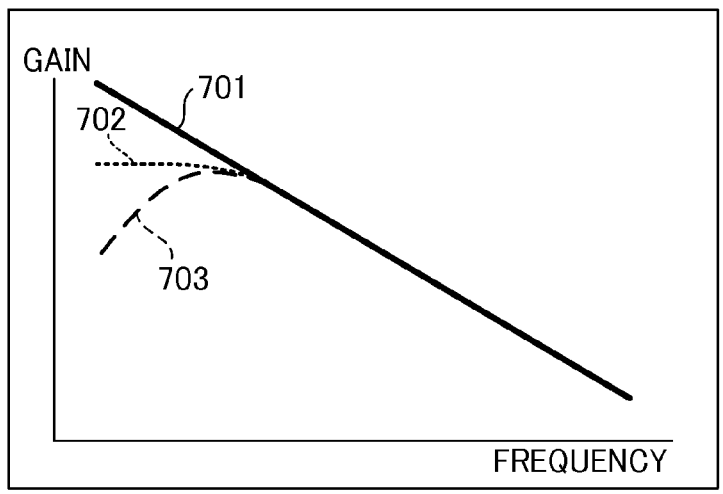
FIG. 7 is an explanatory view illustrating filter gain properties according to the first embodiment of the present invention.

FIG. 7 shows frequency-gain properties of an angle calculation filter. A graph line 701 shows characteristics of an integration filter only (equivalent to 1/s of the aforementioned Formula (1)). A graph line 702 shows characteristics of an integration and an HPF filter used in angle calculation. With graph line 702, there is a flat characteristic in the low-frequency range, and a gain characteristic of the offset portion of angular velocity remains in the angle output. Consequently, in the time interval 604 of FIG. 6, the shake correction amount 2 moves farther away from the zero center as the angular velocity offset increases due to the temperature drift effect of the angular velocity meter.

The shake correction amount 1 shown in the waveform 602 is calculated by adding the HPF 306 to an integration filter (integration and HPF), whereby the characteristics shown in the graph line 703 are obtained, in which the characteristics of the HPF 306 are added to the characteristics of the graph line 702. With the graph line 703, as is clear from the reduced gain in the low-frequency range, the offset component contained in the output of the angular velocity meter 108p can be removed, and an angle is calculated at the zero center. However, because the HPF 306 is used, the image shake correction effect directly after major shaking such as panning or tilting is weakened due to the backlash phenomenon.

Consequently, an appropriate correction effect is better obtained by performing image shake correction using the shake correction amount 2 than the shake correction amount 1. However, in the case of the shake correction amount 2, the filter characteristics shown by the graph line 702 in FIG. 7 exist, whereby flat gain characteristics exist without attenuation of gain in the low-frequency range. In short, the shake correction amount 2 is calculated while the offset component of angular velocity is included. Consequently, when image shake correction is constantly performed based on the signal of the waveform 601, the offset of the shake correction amount 2 also increases due to the temperature drift of the angular velocity offset. In the case when the movable range of the correcting member becomes deficient over time, control may become impossible at the edge of mobility.

In the present embodiment, it is detected whether or not imaging is in progress, and image shake correction is performed during an imaging interval using the signal shown in waveform 603 of FIG. 6. During intervals other than the imaging interval, for example, during EVF display in the preparatory interval prior to imaging, or during AF (automatic focus adjustment) or AE (automatic exposure) operations, or the like, image shake correction is performed using the signal shown in waveform 602 of FIG. 6. By this means, during an imaging interval, the image shake correction effect is enhanced by filter properties that are expanded to the low-frequency range. Moreover, an image shake correction effect can be maintained to a certain extent even apart from the imaging interval. Consequently, the accuracy of AF/AE operations is enhanced, and the ease of framing operations by the photographer is improved.

The imaging interval in FIG. 6 is the interval from an imaging start time 605 to an imaging termination time 606. When image shake correction is performed during the imaging interval according to the signal shown in the waveform 602, in the case when it is directly after panning or the like, a backlash phenomenon may occur due to the effect of the HPF 306. In this case, when image shake correction that differs from the actual shaking is performed, the image shake correction effect is reduced. In the present embodiment, at the imaging start time 605, processing is performed that calculates the difference between the waveform 601 and the waveform 602 as an offset. The signal shown in the waveform 603 obtained by subtracting the offset from the waveform 601 is used during the imaging interval. When imaging processing terminates at the imaging termination time 606, a signal is added to the waveform 603 that causes a return to the waveform 602 at a constant speed. The addition processing is performed until the waveform 603 matches the waveform 602.

By means of the foregoing processing, image shake correction is performed during imaging according to a correction amount calculated with a filter configuration that does not employ the HPF 306. Consequently, a backlash phenomenon does not occur directly after panning or tilting, and the image shake correction effect is enhanced by expanding filter properties to the low-frequency range. The aforementioned correction coefficients pertaining to translational shake correction (see Formulas (6) and (7)) are used only with shake correction amount 2. This is because the movable range of the correcting member is limited, and the movable range for shake correction is exceeded, when translational shake correction is always performed. Enhancement of the image shake correction effect is desirable during imaging of still images. In addition to this, with respect to conditions prior to imaging, a condition can frequently occur where a focus operation is indeterminate, as in AF operations. In order to prevent erroneous calculation of an imaging magnification $\beta$ during AF operations, or the like, an appropriate image shake correction effect is obtained only in the imaging interval. That is, the correction coefficient (L) pertaining to translational shake correction is applied to the angle $\theta$ only with respect to the shake correction amount 2 used in the imaging interval.

In the case when the movable range of the correcting member is limited, and when the imaging magnification $\beta$ is large, as shown in Formula (6), the shake δ increases, with the result that the shake correction amount also increases. In the case of a filter configuration that does not use the HPF 306, the correction gain in the low-frequency range increases, resulting in an increase in low frequency following. Consequently, it is possible that the shake correction amount may immediately exceed the movable range even with control during imaging only. With translational shake correction processing using the rotation radius L, it is difficult to accurately perform image shake correction in the low frequency range. The rotation radius L is calculated with specification of a certain frequency range, and the setting frequency is mainly, for example, between 1 Hz and 10 Hz. Consequently, with respect to shake of 1 Hz or less, there are cases when the rotation radius L may not be accurately calculated. In cases when the rotation radius pertaining to shake of 1 Hz or less is less than the set rotation radius, it is possible that image shake correction may be performed that differs from the actual translational shake in the low frequency range of 1 Hz or less.

In the present embodiment, in order to perform image shake correction within the movable range, and to prevent erroneous control in the low-frequency range in the case when imaging magnification is larger than the threshold value, switching is performed to image shake correction control with filter properties, including the HPF 306. The signal switching unit 308 selects the output of the integration filter 305 or the output obtained through the integration filter and the HPF 306 according to the size of the imaging magnification, and outputs it to the sensitivity adjusting unit 309.

Figure 8:
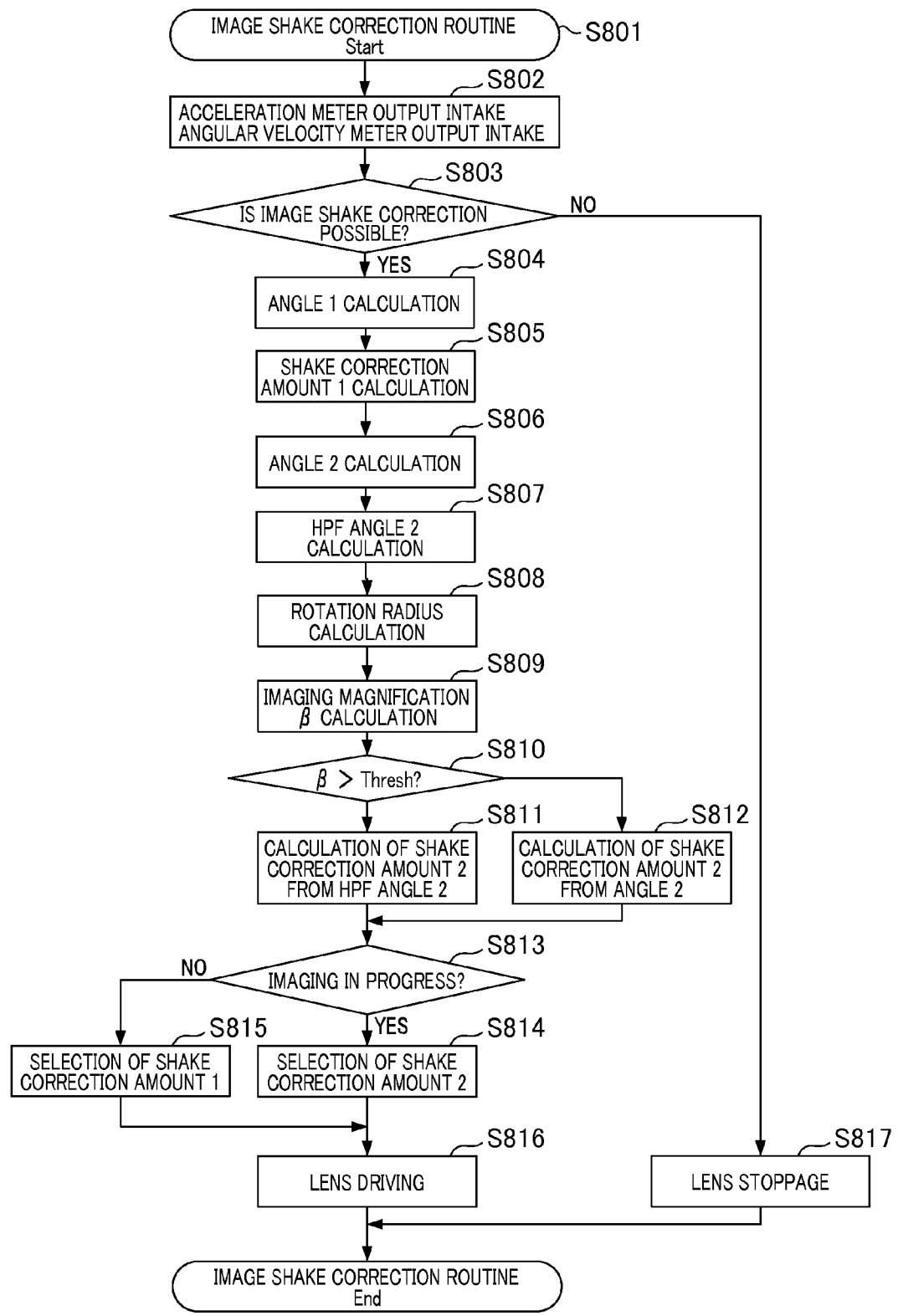
FIG. 8 is a flowchart illustrating operations of the image shake correcting apparatus according to the first embodiment of the present invention.

Next, referencing the flowchart of FIG. 8, a description will be given of the image shake correction processing of the present embodiment. This processing begins when the main power supply of the camera is turned on, and is executed by the camera CPU 106 at a fixed sampling cycle.

When the image shake correction subroutine is initiated in step S801, first, the processing is performed that takes in the respective outputs of the angular velocity meter 108 and the acceleration meter 109 in step S802. Next, step S803 is processing that determines whether or not a state exists wherein image shake correction is possible. If a state exists wherein image shake correction is possible, the processing advances to step S804, and if a state exists wherein image shake correction is not possible, the processing advances to step S817. With the determination processing of step S803, in the period from the point when the power supply is activated until the outputs of the angular velocity meter 108p and the acceleration meter 109p stabilize, it is determined that a state exists wherein image shake correction is not possible. In the case when a certain amount of time passes, and the outputs of the angular velocity meter 108 and the acceleration meter 109 have stabilized, it is determined that a state exists wherein image shake correction is possible. This means that it is possible to prevent a decline in performance due to perform of image shake correction in a state when output values are unstable immediately after activation of the power supply.

In step S804, the HPF integration filter 301 calculates an angle (hereafter referred to as "angle 1") from the output of the angular velocity meter 108p (angular velocity). In step S805, the angle 1 is amplified to calculate the shake correction amount 1 based on a focal distance and an imaging magnification obtained by the sensitivity adjusting unit 303 from the positional information 302 of the zoom lens and the focus lens. In step S806, an angle (hereafter referred to as "angle 2") is calculated by the reference value subtracting unit 3 and the integration filter 305. In step S807, the HPF 306 calculates an HPF angle 2 by subjecting the angle 2 to HPF processing.

Next, in step S808, the comparing unit 314 calculates the rotation radius L based on the respective outputs of the angular velocity meter 108 and the acceleration meter 109. In step S809, the imaging magnification calculation unit 307 acquires the positional information 302 of the zoom lens and the focus lens, and calculates the imaging magnification β. In step S810, the signal switching unit 308 determines whether or not the imaging magnification β is larger than a predetermined threshold Thresh. When the imaging magnification β is larger than the predetermined threshold Thresh, the processing advances to step S811. In step S811, the signal switching unit 308 selects the HPF angle 2 that is the output of the HPF 306, and the sensitivity adjusting unit 309 calculates the shake correction amount 2 from Formula (6). In step S810, when the imaging magnification β is at or below the threshold value Thresh, the processing advances to step S812. In step S812, the signal switching unit 308 selects the angle 2, which is the output of the integration filter 305, and the sensitivity adjusting unit 309 calculates the shake correction amount 2 from Formula (6).

In step S813, it is determined whether or not imaging is in progress, based on the signal of the release SW 105. As a result of determination, if imaging is in progress, the processing advances to step S814, where the signal switching unit 315 selects the shake correction amount 2, and outputs it to the drive unit 112. In this case, image shake correction is performed using the signal shown in the waveform 603 of FIG. 6. If it is determined that imaging is not in progress, in step S813, the processing advances to step S815, where the signal switching unit 315 selects the shake correction amount 1, and outputs it to the drive unit 112. Image shake correction is performed using the signal shown in the waveform 602 of FIG. 6. Next, in step S816, the drive unit 112 drives a correcting lens based on an image shake correction target value. In step S817, the drive unit 112 stops the driving of the correcting lens when image shake correction is not possible in step S803. The image shake correction subroutine terminates as above, and standby ensues until the next sampling cycle arrives.

In the present embodiment, image shake correction is performed by selecting either a filter configuration including the HPF 306, or a filter configuration that does not include the HPF 306, according to the size of the imaging magnification β. This means that it is possible to achieve highly accurate image shake correction relative to angular shake and translational shake, within a limited movable range of the correcting member.

Second Embodiment

Figure 9:
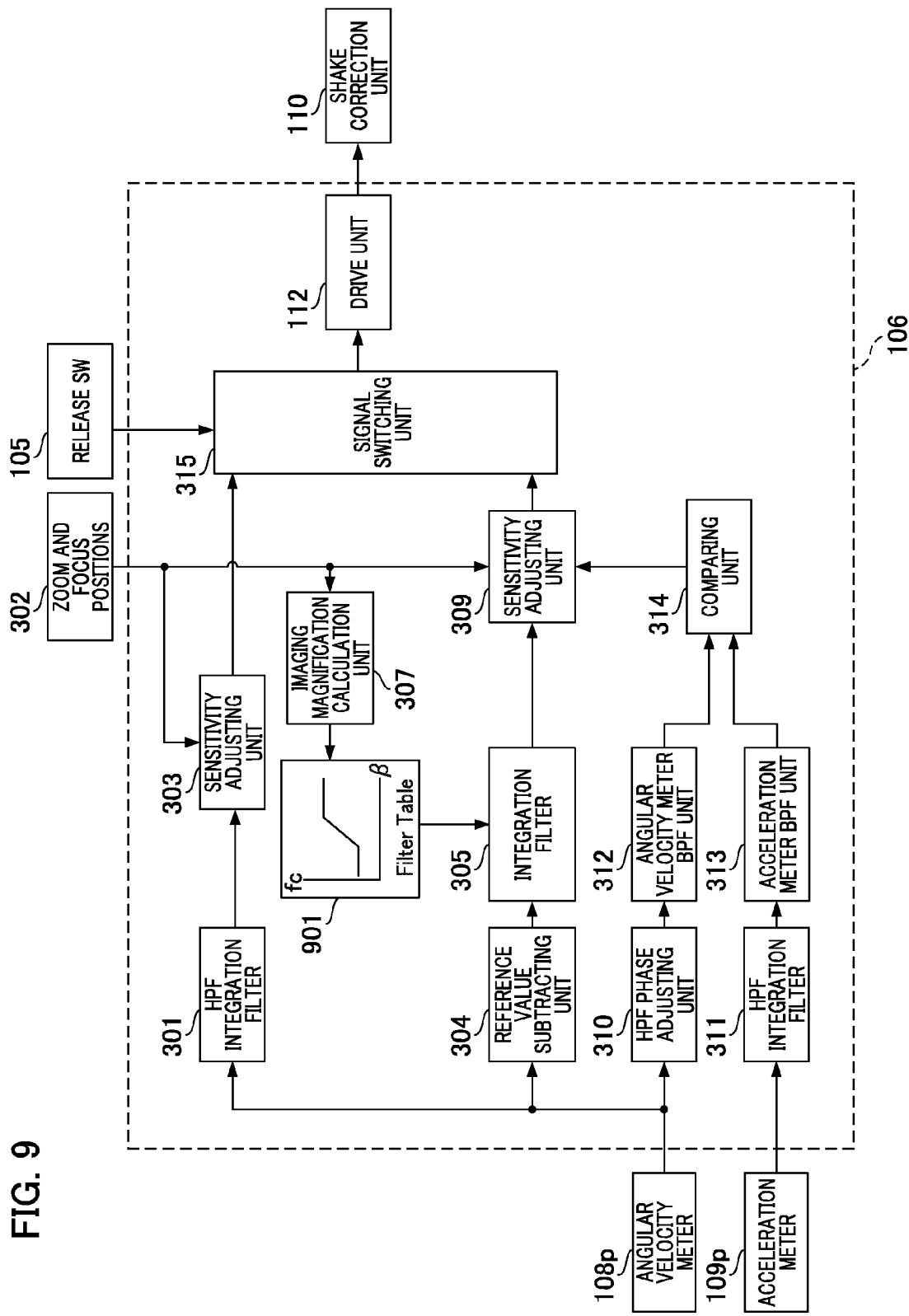
FIG. 9 is a block diagram illustrating an image shake correcting apparatus according to a second embodiment of the present invention.

Next, a second embodiment of the present invention is described. In the second embodiment, a detailed description of components identical to the first embodiment is omitted by using the already employed reference symbols, and mainly the differences are described. This type of descriptive omission is also applied in the subsequent embodiments. FIG. 9 shows a configuration of an imaging unit of an imaging apparatus 101 of the second embodiment, and functional blocks of image shake correction processing executed by a camera CPU 106. The differences in configuration between FIG. 3 and FIG. 9 are as follows.

In FIG. 9, the HPF 306 and the signal switching unit 308 of FIG. 3 are eliminated.

In FIG. 3, the output of the signal switching unit 308 is input to the sensitivity adjusting unit 309, but in FIG. 9, the output of the imaging magnification calculation unit 307 is input to a filter table 901, the output of the filter table 901 is input together with the output of the reference value subtracting unit 304 to the integration filter 305, and the output of the integration filter 305 is sent to the sensitivity adjusting unit 309.

In the first embodiment, the HPF 306 is provided, the angle 2 with HPF or the angle 2 without HPF processing is selected, according to the size of the imaging magnification β, and a shake correction amount is calculated. In the second embodiment, an HPF is not provided, but a filter table 901 is provided, in which cutoff frequencies fc of the integration filter 305 are set according to the size of the imaging magnification β. By setting a cutoff frequency fc from the filter table 901 in the integration filter 305, processing is performed whereby an angle is calculated, and an image shake correction amount is calculated.

The filter table 901 arranges settings so that cutoff frequencies fc increase in a stepwise or continuous manner as the imaging magnification β increases. Consequently, when the imaging magnification β increases, it is possible to prevent the correcting member from immediately exceeding the movable range, and to prevent a failure to obtain a suitable correction effect due to the infeasibility of correction. Furthermore, a predetermined imaging magnification is not set as a boundary so as to determine whether or not to use an HPF, as in the first embodiment. Rather, in the case of the present embodiment, frequency ranges are set that gradually change in accordance with the size of imaging magnification. Consequently, it is possible to perform appropriate image shake correction according to imaging magnification. Moreover, as there is no need to provide the HPF 306 and the signal switching unit 308, accurate image shake correction can be performed, while avoiding enlargement of the processing circuit and the processing program.

In FIG. 9, the HPF 306 is not provided, and the correcting filter is configured only with the integration filter 305. However, one is not limited thereto, and it is also acceptable to adopt a mode wherein the filter configuration is provided with the HPF 306, as in the first embodiment, and cutoff frequencies fc of the HPF 306 are set in the filter table 901. In this case, as well, in angle calculation and calculating processing of an image shake correction amount, the frequency range gradually changes in accordance with the size of imaging magnification, and appropriate image shake correction can be performed according to imaging magnification.

According to the present embodiment, by performing image shake correction by changing a cutoff frequency of a correcting filter according to the size of imaging magnification, it is possible to achieve highly accurate image shake correction relative to angular shake and translational shake within a limited movable range of a correcting member.

Third Embodiment

Figure 10:
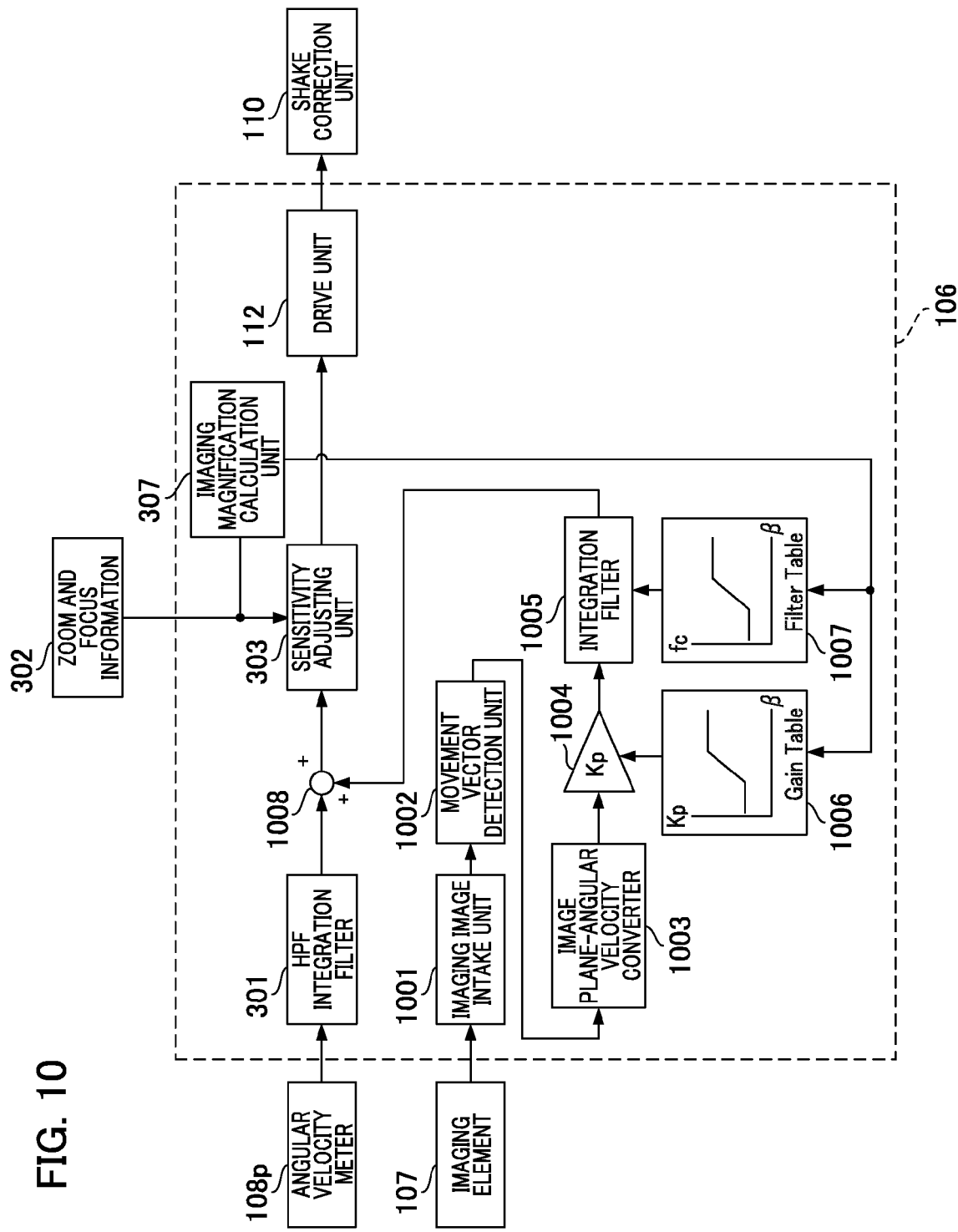
FIG. 10 is a block diagram illustrating an image shake correcting apparatus according to a third embodiment of the present invention.

Next, a third embodiment of the present invention is described. FIG. 10 shows a configuration of an imaging unit of an imaging apparatus 101 according to the third embodiment, and functional blocks of image shake correction processing executed by a camera CPU 106. The present embodiment differs from the first embodiment and the second embodiment in that, instead of the acceleration meter 109, image shake correction is performed by calculating a movement vector from an image signal that is output by the imaging element 107.

The imaging element 107 outputs an imaging signal by photoelectrically converting reflected light from a subject to an electrical signal. The image signal that is output by the imaging element 107 is input to an imaging image intake unit 1001, and is converted to a digital signal at a set frame rate. The image information converted to a digital signal is input to a movement vector detector 1002. Here, by comparing the current image and a pre-stored previous image, i.e., by comparing two images that are temporally continuous, a movement vector can be calculated from the relative displacement information of the paired images. The image information that is extracted may be information that relates to the entirety of the image, or to a portion thereof. It is also acceptable to perform processing that calculates a movement vector by dividing an image into several areas, comparing the respective image information in the divided areas, and selecting an optimal movement vector from among these. In terms of the application of the present embodiment, there are no limitations on movement vector calculation processing.

The movement vector that is output by the movement vector detector 1002 is sent to an image plane-angular velocity converter 1003, where conversion from a shake pixel amount per frame rate σ (that is, a shake pixel velocity) and a cell pitch α to a value equivalent to angular velocity ω is performed by the following Formula (8).

[Formula 8]

$$\omega = (\sigma \times \alpha)/((1+\beta) \times f) \qquad (8)$$

The shake pixel velocity σ includes not only an angular shake amount, but also, other shake factors, such as a translational shake amount. Here, image shake correction is performed, wherein the image displacement that is detected by the movement vector detector 1002 is considered to be due to the angular shake amount only.

The shake angular velocity from the image plane-angular velocity converter 1003 is input to a gain (the coefficient is written as Kp) unit 1004. After a gain coefficient Kp set by a gain table 1006 is multiplied by the shake angular velocity, the integration filter 1005 calculates a signal obtained by performing filtering processing according to a cutoff frequency fc set by a filter table 1007. The imaging magnification β from the imaging magnification calculation unit 307 is respectively input to the gain table 1006 and the filter table 1007. The gain table 1006 raises the translational shake correction effect by increasing the gain coefficient Kp as the value of the imaging magnification β increases. The value of the gain coefficient Kp is set to a value that is less than 1. It is set to a lower value in order to prevent overcorrection when the value of the imaging magnification β is small. The filter table 1007 increases the cutoff frequency fc of the integration filter 1005 as the value of the imaging magnification β increases. That is, when the imaging magnification β is large, the image shake correction effect in the low frequency range is weakened. However, by setting a high gain coefficient Kp by the gain table 1006, the image shake correction effect is significantly enhanced, particularly in the range from 1 Hz to 10 Hz.

Otherwise, angle calculation and image shake correction amount calculation may also be performed with a filter configuration using the HPF 306, as in the case of the first embodiment, and by setting a cutoff frequency fc of the HPF 306 in the filter table 1007. In this case, as the frequency range gradually changes in accordance with the size of the imaging magnification p, appropriate image shake correction can be performed according to imaging magnification.

According to the present embodiment, image shake correction is performed by calculating a movement vector from an imaging image signal that is output by the imaging element 107. By changing a cutoff frequency of the correcting filter according to the size of imaging magnification, it is possible to achieve highly accurate image shake correction relative to angular shake and translational shake within a limited movable range of the correcting member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image shake correcting apparatus, comprising:
    a shake detecting unit configured to detect shake of an apparatus containing an imaging optical system;
    a calculating unit configured to calculate image shake correction amount by acquiring a shake detection signal output from the shake detecting unit; and
    a shake correcting unit configured to correct an image shake in accordance with the image shake correction amount calculated by the calculating unit;
    wherein the calculating unit calculates an imaging magnification of the imaging optical system, and calculates the image shake correction amount by calculating a first correction amount before change of a frequency range of a correction filter and calculates the image shake correction amount by a second correction amount after change of the frequency range of the correction filter, in accordance with a size of the imaging magnification.

2. The image shake correcting apparatus according to claim 1, wherein the shake detecting unit detects angular shake around an axis that is orthogonal to an optical axis of the imaging optical system, and the calculating unit acquires a detection signal of the angular shake, and calculates the first correction amount when the imaging magnification is larger than a threshold value and calculates the second correction amount when the imaging magnification is equal to or less than the threshold value.

3. The image shake correcting apparatus according to claim 1, wherein the shake detecting unit detects translational shake in a direction that is vertical relative to an optical axis of the imaging optical system, and the calculating unit acquires a detection signal of the translational shake, changes frequency properties of the correction filter by comparing the imaging magnification with a threshold value and calculates the second correction amount.

4. The image shake correcting apparatus according to claim 1, wherein the shake detecting unit detects a movement vector by acquiring an imaging image, and the calculating unit acquires the detected movement vector and changes frequency properties of the correction filter according to the size of the imaging magnification.

5. The image shake correcting apparatus according to claim 1, wherein the calculating unit narrows a low frequency range of the correction filter when the imaging magnification is larger than a threshold value, and widens the low frequency range of the filter when the imaging magnification is equal to or less than the threshold value.

6. The image shake correcting apparatus according to claim 1, wherein the calculating unit uses a correction filter that contains a high pass filter when the imaging magnification is larger than a threshold value, and uses a correction filter that does not contain a high pass filter when the imaging magnification is equal to or less than the threshold value.

7. The image shake correcting apparatus according to claim 1, wherein the calculating unit sets a high cutoff frequency of the correction filter when the imaging magnification is larger than a threshold value, and sets a low cutoff frequency of the filter when the imaging magnification is equal to or less than the threshold value.

8. The image shake correcting apparatus according to claim 1, wherein the calculating unit comprises:
    a first calculating unit configured to calculate a first image shake correction amount by acquiring the shake detection signal;
    a second calculating unit configured to calculate a second image shake correction amount by acquiring the shake detection signal; and
    a switching unit configured to switch between the first image shake correction amount and the second image shake correction amount,
    wherein the second calculating unit selects the first correction amount or the second correction amount, and calculates the second image shake correction amount.

9. The image shake correcting apparatus according to claim 8, wherein the second calculating unit integrates a signal obtained by subtracting an offset from the shake detection signal, and switches the first correction amount or the second correction amount according to the imaging magnification.

10. A lens barrel comprising:
    the image shake correcting apparatus according to claim 1.

11. Optical apparatus comprising:
    the image shake correcting apparatus according to claim 1.

12. An imaging apparatus comprising:
    the lens barrel according to claim 10.

13. A control method executed by an image shake correcting apparatus comprising a shake detecting unit configured to detect shake of an apparatus containing an imaging optical system; a calculating unit configured to calculate image shake correction amount by acquiring a shake detection signal output from the shake detecting unit; and a shake correcting unit configured to correct an image shake in accordance with the image shake correction amount calculated by the calculating unit, the control method comprising:
    calculating, by the calculating unit, an imaging magnification of the imaging optical system;
    calculating, by the calculating unit, the image shake correction amount by calculating a first correction amount before change of a frequency range of a correction filter in accordance with a size of the imaging magnification; and
    calculating, by the calculating unit, the image shake correction amount by calculating a second correction amount after change of the frequency range in accordance with the size of the imaging magnification.

* * * * *